Aug. 28, 1962 F. W. W. MORLEY ET AL 3,051,437

ROTORS, FOR EXAMPLE ROTOR DISCS FOR AXIAL-FLOW TURBINES

Filed Nov. 23, 1959

3,051,437
ROTORS, FOR EXAMPLE ROTOR DISCS FOR AXIAL-FLOW TURBINES

Frederick William Walton Morley, Castle Donington, Nelson Hector Kent, Derby, Philip Edgar Hunter, Chellaston, and Wilfred Henry Wilkinson, Turnditch, England, assignors to Rolls-Royce Limited, Derby, England, a company of Great Britain Filed Nov. 23, 1959, Ser. No. 854,885
8 Claims. (Cl. 253—39)

This invention relates to rotors and relates in particular to improved means for mounting a plurality of rotor discs on a shaft. This invention has particular application to the mounting on a shaft of the rotor discs of an axial-flow turbine or compressor such as is used, for example, in a gas-turbine engine.

According to this invention a rotor comprises a plurality of rotor discs whereof one end disc is formed with a central bore and the disc next adjacent to said end disc is secured to or integral with a shaft passing freely through said bore, the said end disc is located radially and circumferentially with respect to said adjacent disc and said end disc is located axially in one sense by abutting said adjacent disc, the locating means and the abutments being located on circles of substantially greater diameter than the diameter of the control bore, and the said end rotor disc is located axially in the other sense by means of a sleeve of which one end abuts axially against the end disc and the other end abuts directly or indirectly against a part secured to the shaft. Preferably, the sleeve abuts against a flange formed on the end disc adjacent the central bore, and in a preferred arrangement, the sleeve extends within the central bore formed in the end disc.

According to a feature of the invention, the end disc may be located radially and circumferentially with respect to the adjacent disc by means of axially-extending dowel pins secured to one of the discs and engaging in corresponding holes in the other disc.

According to another feature of the invention there may be provided an adjusting ring between the sleeve which abuts against the end disc and the part secured to the shaft, the adjusting ring having its axial dimension so chosen that the sleeve and the disc are placed in compression and the shaft is placed in tension.

Two embodiments of this invention will now be described by way of example with reference to the accompanying drawings in which.

Figure 1:
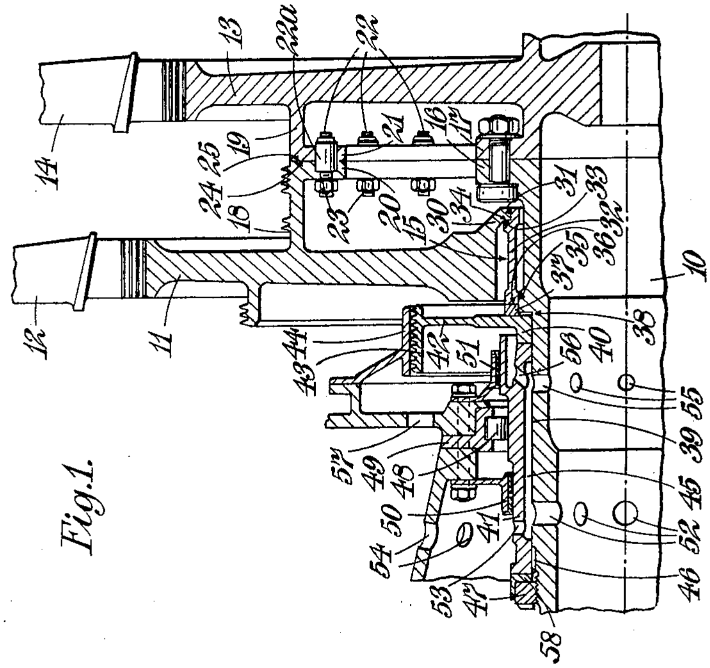
FIGURE 1 shows the first embodiment in axial section.

Referring to FIGURE 1, there is shown a turbine rotor of a gas-turbine engine, the rotor comprising a shaft 10, a first-stage rotor disc 11 carrying at its periphery the first-stage rotor blades 12, and a second-stage rotor disc 13 carrying at its periphery the second-stage rotor blades 14. There may be provided further discs and rows of rotor blades downstream of disc 13 (i.e. to the right in the drawing) but such discs and blades are not shown.

The first-stage rotor disc 11 is provided with a central bore 15, the diameter of which is substantially larger than the outside diameter of the shaft 10, and the shaft passes through the bore 15. The shaft 10 is formed at its end with an outwardly-directed flange 16 by which it is bolted to a corresponding flange 17 on the upstream side of the disc 13.

The first-stage rotor disc 11 is supported in the following manner. Both the first-stage disc 11 and the second-stage disc 13 are provided at a substantial radius from the rotor axis with axial flanges 18, 19, the flanges abutting one another and being formed at their free ends with inwardly-directed portions 20, 21. The external cylindrical surfaces of the flanges 18 and 19 may be formed with ribs to afford the rotating component of a labyrinth seal to co-operate with a stationary component supported by stator structure. Secured to the inwardly-directed portion 20 is a series of axially-extending dowel pins 22, each of which has a threaded shank extending through a hole in the portion 20 and secured in position by a nut 23. Each dowel pin has a head at one end of the shank, and a tubular collar **22*a* which surrounds the shank and abuts the head, and forms the actual locating surface of the dowel pin. The inwardly-directed portion 21 of the flange 19 on the second-stage disc 13 is provided with a corresponding series of reamed holes with which the collars 22*a* on the dowel pins 22 engage, thereby to locate the discs 11 and 13** radially and circumferentially with respect to one another.

The disc 11 is located against displacement in the downstream direction by the end face 24 of flange portion 20 abutting the corresponding end face 25 of the flange portion 21 on disc 13.

The disc 11 is located against axial displacement in the opposite sense, i.e. in the upstream direction, in the following way. The disc 11 is provided adjacent its downstream face with a flange 30 which extends radially-inwardly and the flange 30 itself has a central bore 31. The bore 31 has extending within it a sleeve 32 which has a radial face 33 axially abutting a corresponding radial face 34 on the flange 30. The sleeve 32 is shrunk into the bore 31 of the disc 11 with an interference such that it does not become slack with the thermal and elastic growth of the bore during running of the engine. The sleeve 32 has a clearance from the shaft 10 over the major portion of its length including the end at which it engages the flange 30. At its other end the sleeve 32 is a close fit on an annular land 35 formed on the shaft 10, and this end of the sleeve 32 is also provided with a radial end surface 36. The end surface 36 of the sleeve 32 abuts against one radial face of an adjusting ring 37 which is of such axial dimension as to overhang a step 38 formed on the shaft 10 by the provision of the land 35 and which thus has its other radial face of the adjusting ring 37 projecting from the radial face of the step 38 in the shaft. The portion 39 of the shaft which is of smaller diameter than the land 35, by reason of the step 38, has secured on it a pair of sleeve members 40, 41. One axially-facing end surface of the first sleeve member 40 abuts the adjusting ring 37 and the other end surface abut against the other sleeve member 41. The sleeve member 40 also has a radial flange 42 which is formed at its periphery with an axial flange 43 having on it ribs which form the rotating component of a labyrinth seal. The stationary component 44 of the labyrinth seal is supported by adjacent stationary structure.

The other sleeve 41 is formed with an internal groove 45 over part of its length and is also formed at its end remote from the step 38 with a set of splines 46 which engage corresponding splines on the shaft 10. This end of the sleeve 41 affords a radial face against which bears a locking washer 58 retained by a nut 47 having threaded engagement with the shaft 10.

The sleeve 41 forms part of a roller bearing supporting the shaft, the rollers 48 running on part of its external surface. The outer race 49 of the roller bearing forms part of the stationary structure. The sleeve 41 also affords the rotating component of a pair of oil seals, the stationary components 50, 51 of which are also carried by the stationary structure. A flow of air is permitted from within the bore of the shaft 10 around the bearing 48 ,49, the air flowing through holes 52 in the shaft, holes 53 in the sleeve 41 and holes 54 in the stationary structure, and also through holes 55 in the shaft 10, holes 56 in the sleeve 41 and holes 57 in the stationary structure.

The axial thickness of the adjusting ring 37 is so chosen that when the nut 47 is tightened up the shaft 10 and also the flange 17 on disc 13 are placed in tension, and the flanges 18 and 19 on discs 11 and 13, the sleeve 32, adjusting ring 37, sleeve 40 and sleeve 41 are placed in compression.

During assembly of the rotor, the second-stage disc 13 is first secured to the shaft 10 by means of bolting flanges 16, 17. The second-stage nozzle guide vanes (not shown) are assembled in a jig which surrounds them and are placed in position upstream of the disc 13 and rotor blades 14. The first-stage disc 11 with the dowels 22 attached thereto is next placed in position so that the collars 22*a* on dowel pins 22 engage the holes in flange portion 21, and the sleeve 32, adjusting ring 37, sleeve 40 and sleeve 41 may then successively be assembled. Finally the nut 47 together with its locking cup-washer is placed in position. When the rotor is assembled in the engine, it is slid in axially and the second-stage nozzle guide vanes slide into a corresponding part of the casing and out of the jig.

It will be seen that the construction of the invention has the advantage as compared with constructions in which the first-stage turbine disc is mounted on the shaft in the manner of disc 13 of this construction, that the axial length of the rotor is reduced, in particular the distance between the plane of the bearing 48 and the central plane of the disc 11 which in the low-pressure turbine rotor disc is larly important where the turbine is overhung, as is usual, as it causes the centre of gravity of the turbine rotor assembly to be brought nearer to the plane of the bearing.

Figure 2:
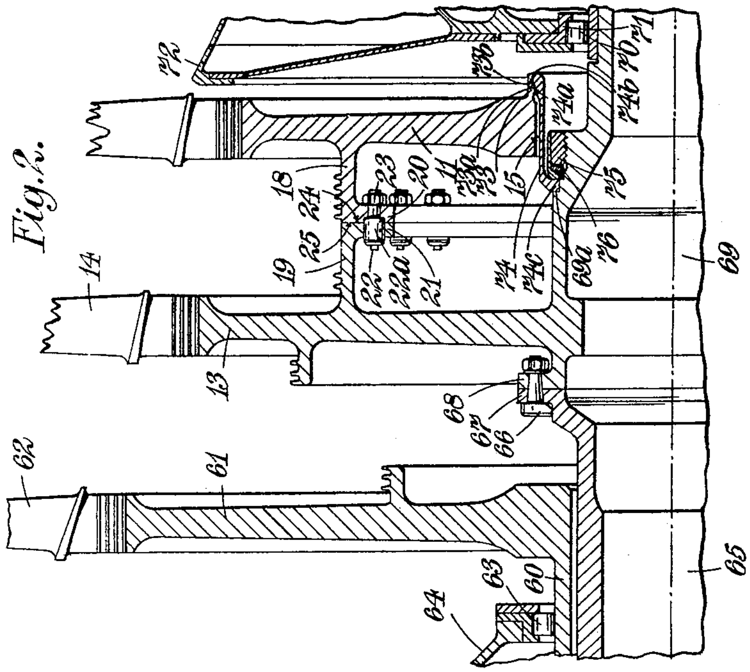
FIGURE 2 is a corresponding view of the second embodiment.

FIGURE 2 shows the invention applied to the low-pressure turbine rotor of a two-shaft gas turbine engine, like numerals being used for parts common to the two embodiments.

The high-pressure turbine rotor is illustrated as comprising a shaft 60, which is drivingly connected with the high-pressure compressor (not shown) and the high-pressure turbine disc 61 which carries at its periphery a row of high-pressure turbine blades 62. The shaft 60 is supported by a roller bearing 63 carried from engine stationary structure, part of which is illustrated at 64.

Nested coaxially within the shaft 60 is a shaft, part 65 of which is secured by taper bolts 66 passing through bolting flanges 67, 68 to a shaft part 69. Integral with shaft part 69 is the rotor disc 13 which in this embodiment is the intermediate-pressure turbine rotor disc and rotor disc 11 which is the low-pressure turbine rotor disc is mounted on shaft part 69. The shaft part 65 is drivingly connected with the low-pressure compressor rotor (not shown) and is also supported at its left-hand end in bearing means (not shown). The shaft part 69 is supported by a roller bearing 70 carried from stationary structure 71 carried by the exhaust cone 72 which in turn is supported by the exhaust outlet duct of the engine in a manner not shown.

The rotor disc 11 is located against displacement in the upstream direction by the end face 24 of flange portion 20 abutting the end face 25 of flange portion 21 on disc 13. The two discs 11 and 13 are located radially and circumferentially with respect to each other by a dowel pin arrangement as with the first embodiment.

The disc 11 is located against axial displacement in the downstream direction in the following way. The disc 11 is provided at the downstream end of its bore 15 with an axially-directed flange 73 which has a central bore 73*a* and an end face 73*b*. The bore has extending within it a sleeve 74. The sleeve 74 has a cylindrical outer portion 74*a* which is an interference fit with the bore 73*a* of the flange 73, and a radial flange 74*b* the upstream end of which abuts the end face 73*b* on the flange 73. At its upstream end, the sleeve 71 has an inturned radial flange 74*c* which is received in a stepped portion 69*a* of the shaft part 69. The bore formed internally of the flange 74*c* is arranged to have an interference fit with the stepped portion 69*a*. The sleeve 74 is retained by a nut 75 provided with a locking washer 76.

The length of the sleeve 74 is chosen so that, when the nut 75 is tightened, the sleeve 74 and the portion of the shaft part 69 between the disc 13 and the nut 75 are placed in tension and the flanges 18, 19 on discs 11 and 13 are placed in compression.

The construction presents the advantage compared with a construction where the disc 11 is mounted directly on the shaft part 69 that the axial length of the rotor is reduced and in particular the disc 11 is brought nearer to the supporting bearing 70. This is particularly the case where cooling arrangements for the rotor (which are not illustrated) are provided downstream of the disc 11 thus increasing the length of the shaft part from the downstream face of the disc to the bearing.

We claim:

1. A rotor comprising a plurality of rotor discs including an end rotor disc and an adjacent rotor disc next to the end rotor disc, said end rotor disc being formed with a central bore having a first diameter, a shaft rotatively secured to the said adjacent rotor disc, the shaft having a diameter smaller than said first diameter and the shaft extending through the said central bore with radial clearance from the said end rotor disc, cooperating oppositely-facing axially directed first abutments on the said end rotor disc and on the adjacent rotor disc, locating means interconnecting said end rotor disc and said adjacent rotor disc and holding them against radial and circumferential relative displacement, the locating means and the axially-directed abutments being located on circles of substantially greater diameter than the diameter of the said central bore, a second axially directed abutment on the end rotor disc adjacent the central bore and facing in the opposite direction to the first abutment thereon, an axially-directed abutment on the shaft facing in the opposite direction to the second abutment on the end rotor disc, and on the side of the end rotor disc remote therefrom, a sleeve on the shaft, said sleeve having axially-directed abutments cooperating with the second abutment on the end rotor disc and the abutment on the shaft, and means urging said abutments on the sleeve axially into engagement with said second abutment on the end rotor disc and with the abutment on the shaft.

2. A rotor according to claim 1, comprising a radially-inwardly extending flange on the end rotor disc adjacent the central bore, said flange having an axially-directed surface affording said second abutment on the end rotor disc.

3. A rotor according to claim 2, said abutment on the shaft being adjacent one end of the central bore of the end rotor disc and the said flange being on the end rotor disc adjacent the other end of said central bore, and said sleeve extending through said central bore with radial clearance from both said shaft and said end rotor disc.

4. A rotor according to claim 1, said locating means comprising axially-extending dowel pins secured to one of the discs and engaging in corresponding holes in the other disc.

5. A rotor according to claim 1, there being an adjusting ring between the sleeve and the abutment on the shaft, the adjusting ring having a selected axial dimension, ensuring that the sleeve and part, at least, of the end rotor disc are placed in compression and the shaft is placed in tension.

6. A rotor according to claim 5, there being a land on the shaft, the sleeve and the adjusting ring each having a selected internal diameter ensuring a close fit on the land adjacent their cooperating abutments, the land forming a step on the shaft within the axial extent of the adjusting ring, further sleeve means encircling the shaft and abutting the adjusting ring on the side remote from the land on the shaft, and a nut threaded on the shaft abutting said further sleeve means at its end remote from the land on the shaft and urging said further sleeve means towards the land on the shaft.

7. A rotor according to claim 6, said further sleeve means affording the inner race of a roller bearing supporting the shaft.

8. A rotor according to claim 1, there being a shoulder on the shaft, the sleeve abutting directly said shoulder and having a selected axial dimension ensuring that the end rotor disc and the adjacent rotor disc are in compression adjacent the circles on which the locating means and axially directed abutments are located, and that part, at least of the shaft is in tension.

References Cited in the file of this patent

UNITED STATES PATENTS

| | | |
|---|---|---|
| 1,326,870 | Junggren | Dec. 30, 1919 |
| 1,873,956 | Dahlstrand | Aug. 30, 1932 |
| 2,548,886 | Howard | Apr. 17, 1951 |
| 2,618,463 | Lombard et al. | Nov. 18, 1952 |
| 2,657,901 | McLeod | Nov. 3, 1953 |
| 2,749,086 | Lombard | June 5, 1956 |
| 2,818,228 | Petrie | Dec. 31, 1957 |
| 2,928,649 | Lombard et al. | Mar. 15, 1960 |